Dec. 25, 1951　　　F. A. PEARNE　　　2,579,957
VACUUM HEADER FOR COMBINE HARVESTERS
Filed Oct. 30, 1947　　　3 Sheets-Sheet 1
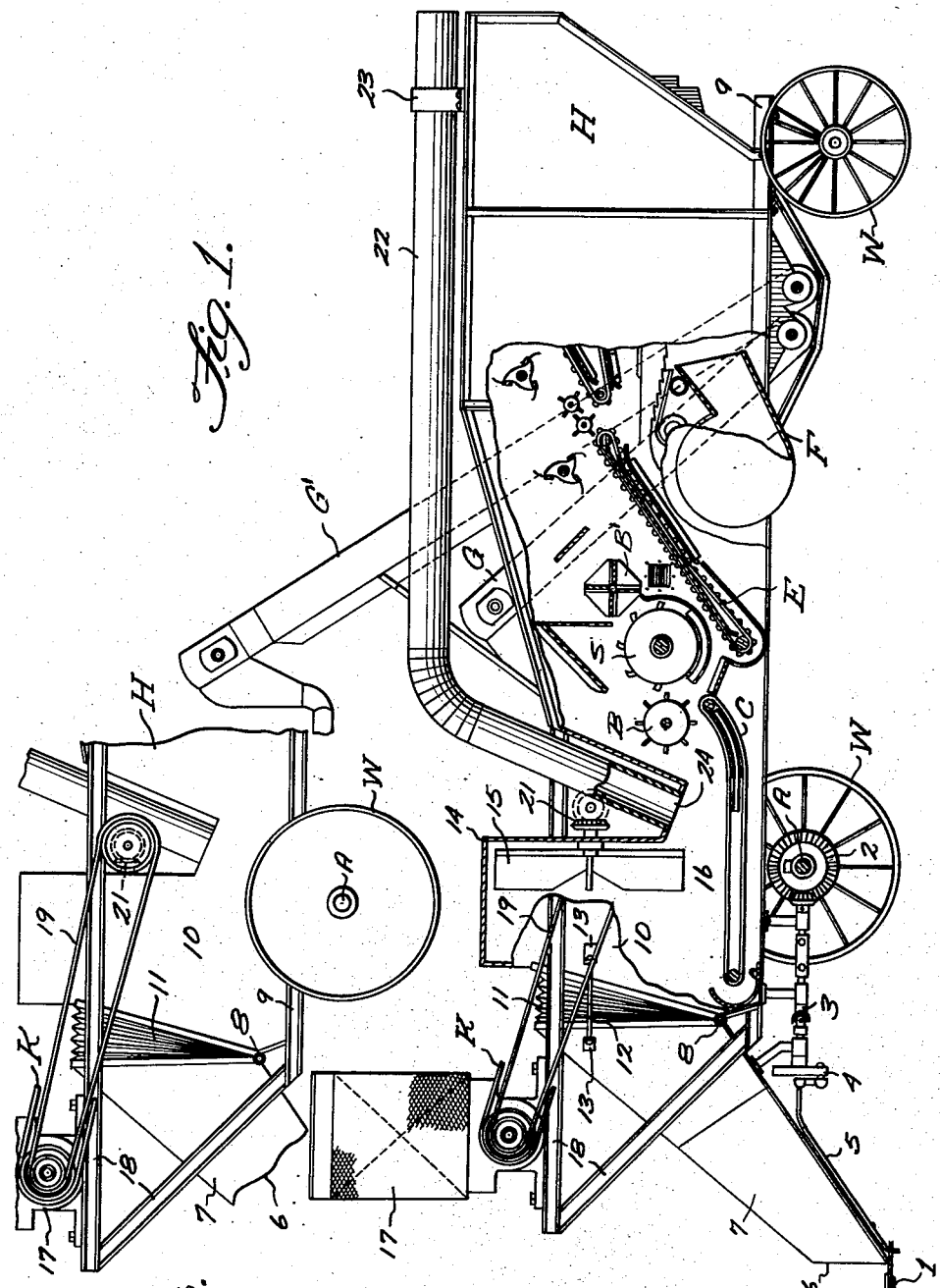
INVENTOR.
Frederic A. Pearne
BY Victor J. Evans & Co.
ATTORNEYS

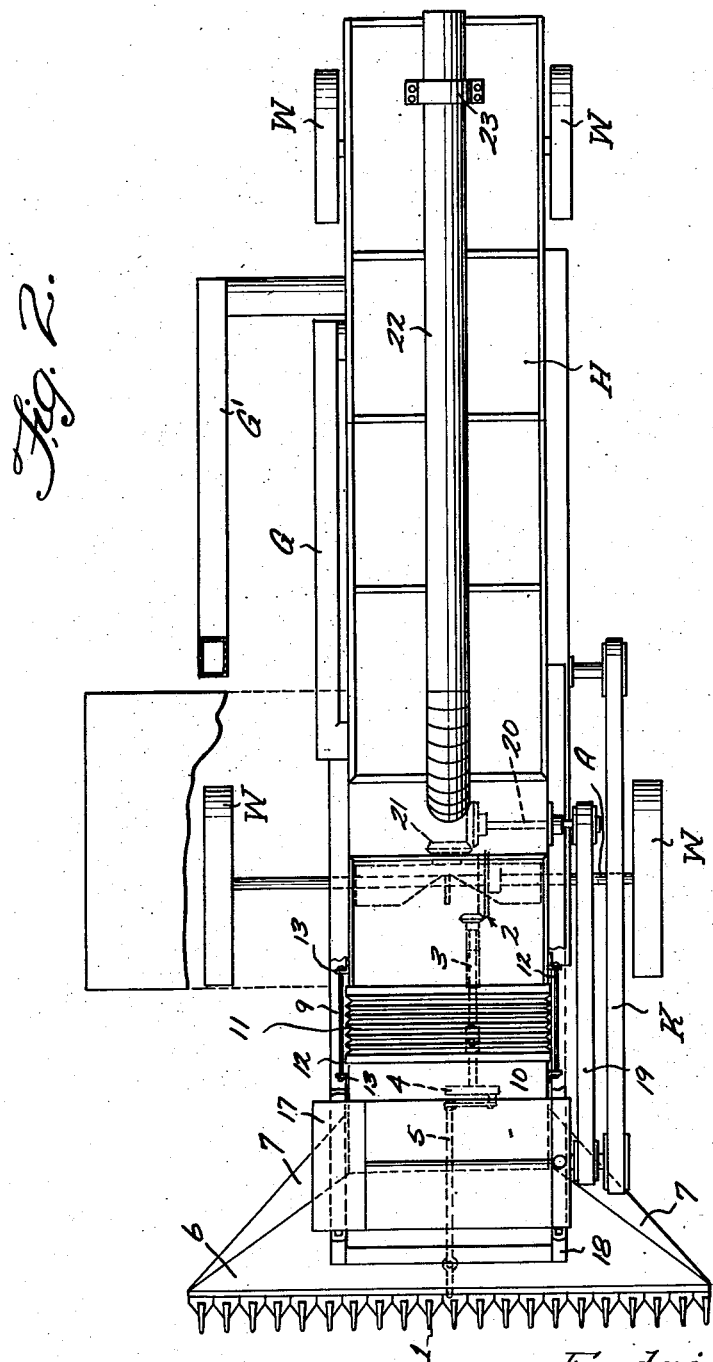

Dec. 25, 1951         F. A. PEARNE              2,579,957
              VACUUM HEADER FOR COMBINE HARVESTERS
Filed Oct. 30, 1947                            3 Sheets-Sheet 3
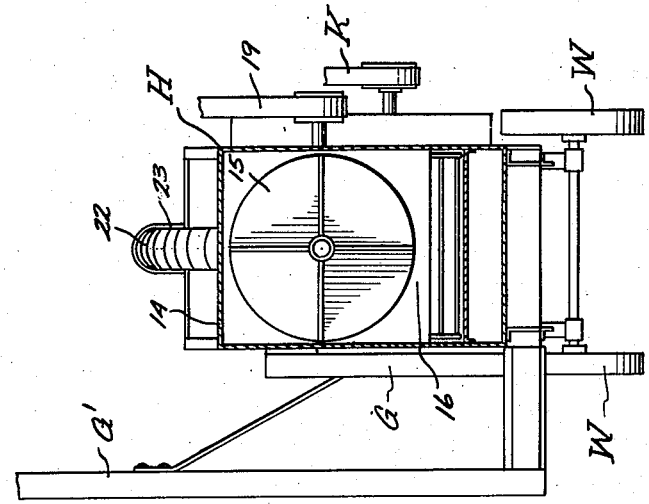
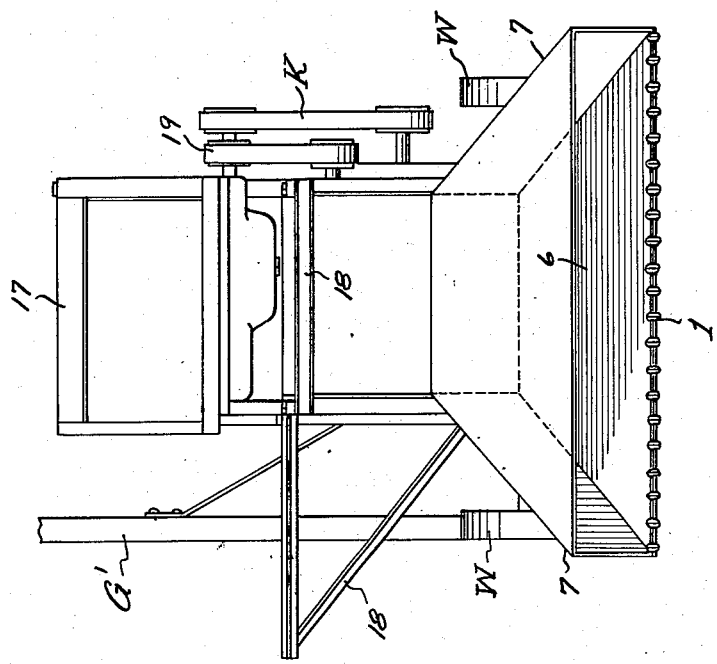
INVENTOR.
Frederic A. Pearne,
BY *Victor J. Evans & Co.*
ATTORNEYS Patented Dec. 25, 1951

2,579,957

UNITED STATES PATENT OFFICE 2,579,957

VACUUM HEADER FOR COMBINE HARVESTERS

Frederic A. Pearne, Biggs, Calif.

Application October 30, 1947, Serial No. 783,081

2 Claims. (Cl. 56—123)

My present invention relates to the general class of harvesters, seed gatherers, or strippers, of the type employed in cutting, conveying, and threshing or separating grain, and more specifically to an improved vacuum header for a combine harvester that includes a front reciprocating cutter equipped with pneumatic means for conveying the cut grain to the conveying and separating appliances of the conventional combine harvester.

In the preferred form of the invention I have shown the header, which gathers the cut grain, adjustably mounted at the front of an automotive vehicle or self-propelled harvester together with the reciprocating cutter of the sickle type, and these co-operating parts are vertically adjustable with relation to the standing crop, and for purposes of transportation of the combine from field to field.

The appliance of my invention is made up of a minimum number of parts that may with facility be manufactured with low cost of production, and the parts may be assembled with convenience to provide an attachment that may readily be installed at the front of various types of threshers or harvesters, to eliminate some of the operating parts of the conventional harvester, and to improve the operation of separating the harvested grain. To this end the invention consists in certain novel features of construction and combinations and arrangements of parts as will hereinafter be described and more particularly set forth in the appended claims.

In the accompanying drawings I have illustrated a complete example of a physical embodiment of my invention wherein the parts are combined and arranged in accord with one mode I have devised for the practical application of the principles of my invention. It will however be understood that changes and alterations are contemplated and may be made in these exemplifying drawings and mechanical structures, and in installing the attachment to a conventional harvester, within the scope of my claims, and without departing from the principles of the invention.

Figure 1 is a view in side elevation of a typical combine harvester, with parts broken away to illustrate some of the interior grain separating appliances and devices, and equipped with the attachment of my invention.

Figure 2 is a top plan view of the implement in Fig. 1.

Figure 3 is a front elevation of the implement with some parts omitted; and Figure 4 is a vertical transverse sectional view through the attachment at the front of the implement or harvester.

Figure 5 is a fragmentary view in side elevation showing the operating motor, with the driving mechanism for the suction fan of the pneumatic grain-gathering header.

In order that the general arrangement and relation of parts may readily be understood I have shown parts of a conventional harvester of the self propelled type that includes the usual housing H and wheels W, and the front axle A. Within the housing an endless conveyor C carries the harvested crop toward the separating cylinder S which is equipped with the usual concave, and the rotary beaters B, B'; the separated grain is carried by the endless elevator E to other parts of the implement and the usual blower F assists in conveying the straw to the conveyors G, G' exterior of the implement. These interior endless and rotary parts of the combine are operated by a belt drive K from a suitable motor 17 mounted by means of its frame 18 at the front of the implement, as indicated.

A reciprocating cutter 1 of the sickle type is mounted at the front of the implement, and as disclosed in Figs. 1 and 2 the cutter is actuated from the axle A, through a bevel-gear couple 2, to the rotary gear shaft 3, and an eccentric 4 transmits power to an oscillating arm 5 for translating the rotary movement into reciprocating movement of the sickle or cutter.

The cutter is vertically adjustable in adapting it to the standing grain, and for transportation, and for this purpose it is mounted on and located beneath an adjustable and pneumatic or suction header 6, which is of ample width to conform to the size of the cutter and the usual swath cut thereby; and this hollow header is fashioned with rearwardly converging side walls 7, 7, that terminate at a hinge joint 8 mounted transversely of the main frame 9 of the implement.

The rear open end of the pneumatic or suction header opens to the interior of an enclosure or header-housing 10 forming an air chamber that is erected on the main frame 9, and the rear end of the header and the front end of the header housing are connected by means of an adjustable hood 11 that is made up of accordian pleats or bellows folds to permit ready adjustment of the cutter together with the pneumatic header with relation to the header housing.

The cutter and the header may readily be adjusted and retained in adjusted position by suitable means, as for instance by a pair of horizontally arranged screw bars 12, 12 located at the exterior sides of the header and its housing and mounted in bearing brackets 13, 13 of these respective structures, and these adjusting bars may manually be turned for adjusting the header and the cutter.

As the combine or harvester advances through the field the crop of standing grain is cut by the sickle and the cut grain falls rearwardly into the mouth of the pneumatic header through which a suction of air is created for passing the cut crop into the interior of the grain separator, and for this purpose the header-housing is fashioned with an upper and rear extension 14 forming a fan casing 14 in which a rotary fan or blower 15 is mounted in vertical position.

The fan is supported on its horizontal axis at the rear of the header housing, and above the front end of the conveyor C, and the outer periphery of the fan, as best seen in Fig. 1 is located above the conveyor and above the space 16 that forms an air chamber open at its front end to the header and at its rear end to the interior of the housing where the grain separating apparatus is located.

By this arrangement of parts, and in co-action with the conveyor C, a stream or current of air is drawn in through the mouth of the header carrying with it the cut grain which is conveyed to the first beater B and cylinder S, and thence to the other separating devices of the implement.

The fan is operated from the motor 17 by an exterior belt drive 19 transmitting power and rotary movement to a gear shaft 20 and the bevel gear coupling 21 journaled in bearings mounted in the fan casing, and thence to the rotary fan or blower 15.

An exhaust air duct 22 is conveniently located over the top of the housing H and supported on brackets as 23, and the intake end or mouth 24 of the air duct is located just above the flue or air passage 16 of the header-housing to divert and receive a portion of the air stream. The bottom periphery of the fan 15 is located above the inflowing cut grain thereby eliminating possibility of contact of the fan with the grain, and the mouth of the exhaust air duct 22 is located behind and above the lower periphery of the fan where it is not in position to divert the desired crop, but may convey some undesired debris and deposit it at the rear of the implement.

The combine with the attachment may harvest rice, wheat, barley and other crops, and the crop is delivered or conveyed to the separating mechanisms without the necessity for use of various appliances utilized in existing harvesters, thereby enhancing the efficiency of the combine and improving the construction and operation of various parts of the implement.

Having thus fully described my invention, what I claim as new and desire to secure by Letters Patent is:

1. In a harvester, a frame, a housing supported on said frame, front and rear wheels for supporting said frame, an axle extending between said front wheels, a first endless conveyor arranged in said housing for conveying the harvested crop rearwardly in said housing, a cylinder in said housing for receiving the material from said conveyor and separating the grain therefrom, an endless elevator arranged rearwardly of said conveyor for receiving the grain, means for actuating said conveyor and elevator, a suction header including rearwardly converging side walls hingedly connected to said frame, a reciprocating cutter mounted on the front of said header, means operatively connecting said cutter to said axle, a header housing located rearwardly of said header, and supported on said frame, a flexible hood connecting said header to said header housing, manually operable means for adjusting said header housing, said header housing including an upper rear extension defining a casing, a rotary fan mounted in said casing, said fan being located above said first conveyor, means for operating said fan, and an open-ended exhaust air duct having its front end arranged contiguous to said fan and its rear end terminating at the rear of said housing.

2. In a harvester, a frame, a housing supported on said frame, front and rear wheels for supporting said frame, an axle extending between said front wheels, a first endless conveyor arranged in said housing for conveying the harvested crop rearwardly in said housing, a cylinder in said housing for receiving the material from said conveyor and separating the grain therefrom, an endless elevator arranged rearwardly of said conveyor for receiving the grain, means for actuating said conveyor and elevator, a suction header including rearwardly converging side walls hingedly connected to said frame, a reciprocating cutter mounted on the front of said header, means operatively connecting said cutter to said axle, a header housing located rearwardly of said header and supported on said frame, a flexible hood connecting said header to said header housing, manually operable means for adjusting said header housing, said header housing including an upper rear extension defining a casing, a rotary fan mounted in said casing, said fan being located above said first conveyor, means for operating said fan, and an open-ended exhaust air duct having its front end arranged contiguous to said fan and its rear end terminating at the rear of said housing, said reciprocating cutter being of the sickle type and said manually operable means embodying a pair of horizontally disposed screw bars.

FREDERIC A. PEARNE.

REFERENCES CITED

The following references are of record in the file of this patent:

UNITED STATES PATENTS

| Number | Name | Date |
|---|---|---|
| 1,122,375 | Engle | Dec. 29, 1914 |
| 1,844,750 | Ellis | Feb. 9, 1932 |
| 2,065,721 | Mutzbauer | Dec. 29, 1936 |
| 2,330,727 | May | Sept. 28, 1943 |

FOREIGN PATENTS

| Number | Country | Date |
|---|---|---|
| 22,035 | Norway | Feb. 17, 1912 |
| 7,420/27 | Australia | July 3, 1928 |